Inventor
Wilhelm Riehl
BY
W. F. Wagner
Attorney

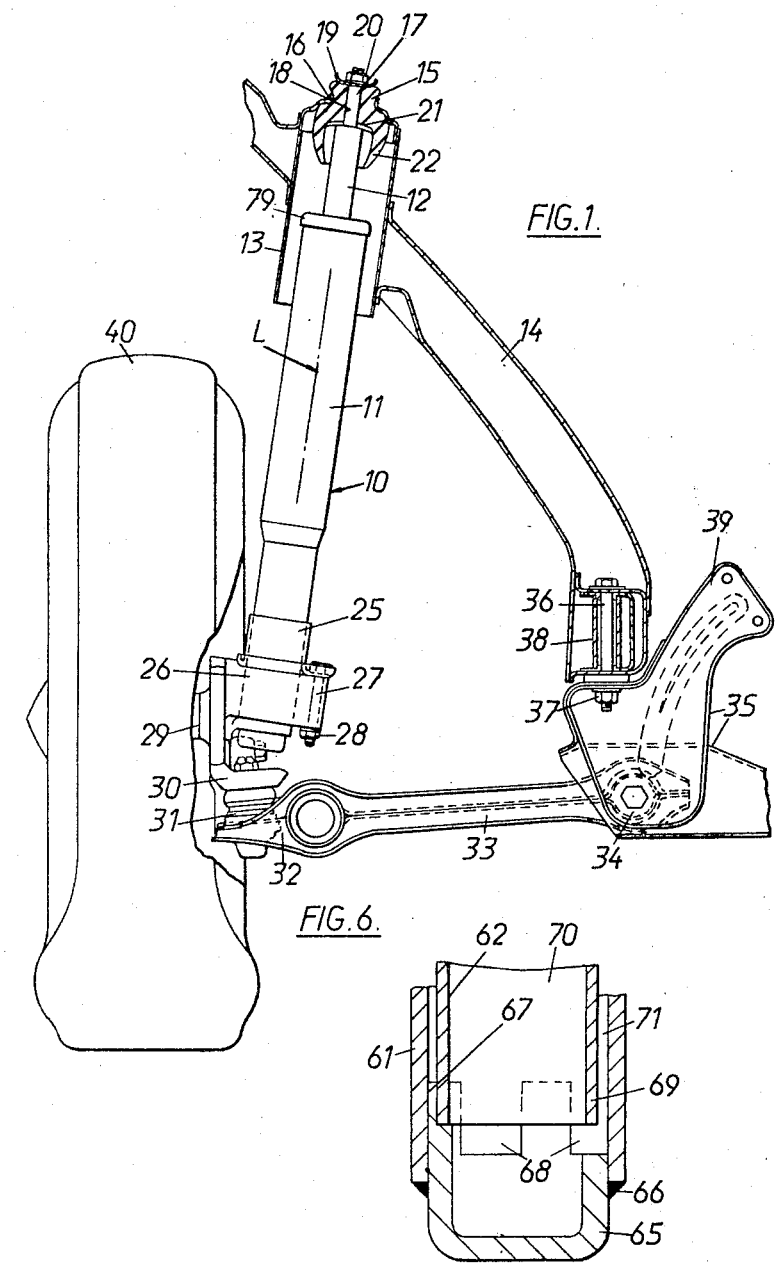

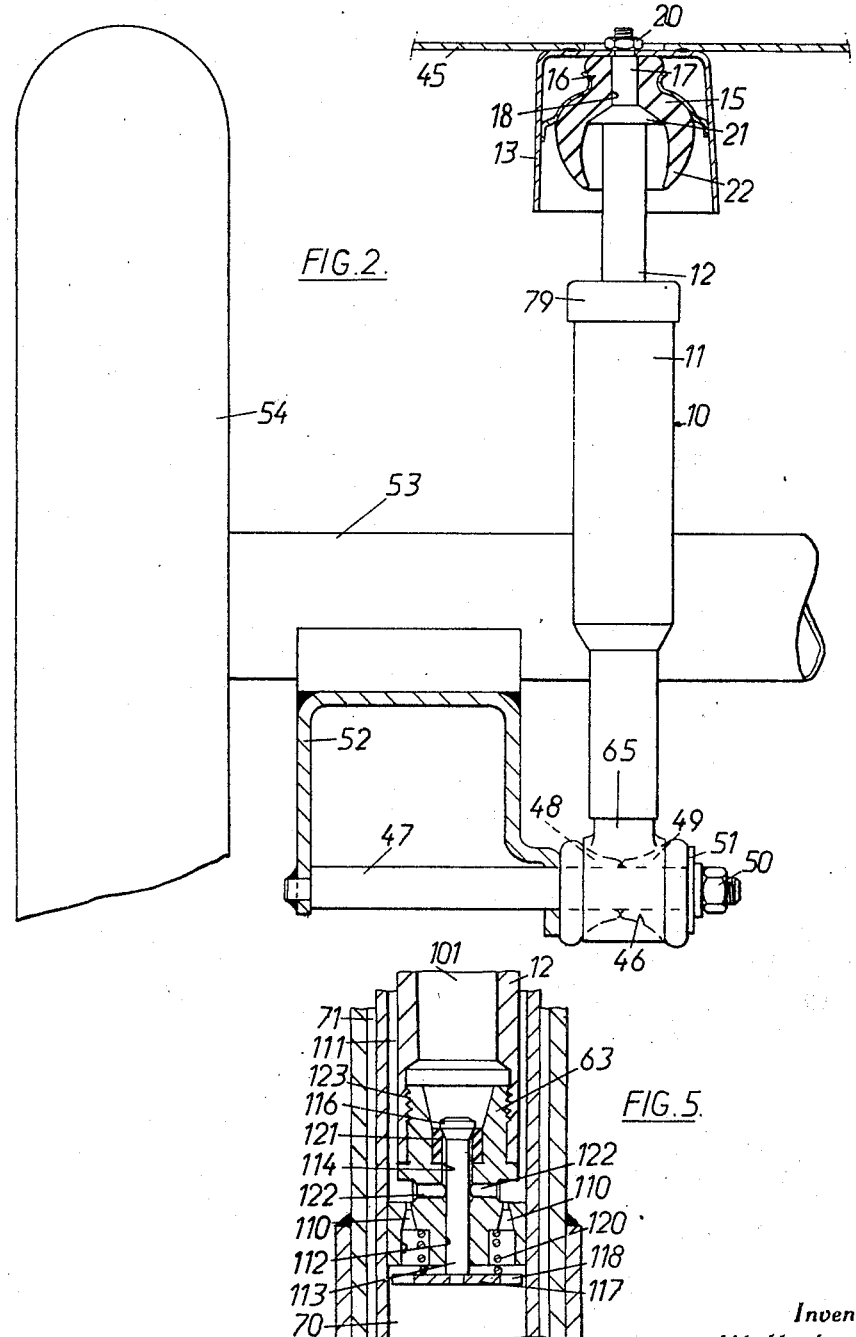

United States Patent Office 3,430,977
Patented Mar. 4, 1969

3,430,977
HYDROPNEUMATIC SUSPENSION DEVICES
Wilhelm Riehl, Raunheim am Main, Germany, assignor to General Motors Corporation, Detroit, Mich., a corporation of Delaware
Filed Nov. 29, 1966, Ser. No. 597,592
Claims priority, application Germany, Dec. 3, 1965, O 11,303
U.S. Cl. 280—124         14 Claims
Int. Cl. B60g 17/08; F16f 9/10

ABSTRACT OF THE DISCLOSURE

A hydropneumatic suspension device comprising a damper tube for hydraulic fluid; a hollow piston rod having one end disposed within the damper tube and including in its hollow interior a storage space serving as a pressure reservoir; a damper piston slidably disposed within the damper tube and connected to said one end of the piston rod divides the interior of the damper tube into a working space and an annular space surrounding the piston rod, and is formed with at least one duct interconnecting the working space and the annular space; and a valve displaceable by movement into engagement with a resilient abutment in the tube to establish a connection between the working space and the storage space.

---

This invention relates to hydropneumatic suspension devices, for example for use in motor vehicle suspension systems incorporating such suspension devices.

The hydropneumatic suspension devices with which the invention is concerned combine, in a compact and self-contained unit, the functions of hydropneumatic suspension and damping, and self-regulating height adjustment.

The invention also comprehends such a suspension device connected between a sprung portion of a motor vehicle and a carrier for a respective road wheel of the vehicle.

The appended claims define the scope of the invention claimed. The invention and how it can be performed are hereinafter particularly described with reference to the accompanying drawings, in which:

FIGURE 1 is a schematic view of a portion of an independent front wheel suspension of a motor vehicle incorporating a first embodiment of a hydropneumatic suspension device according to the invention, arranged to serve at the same time as a guide rod for the suspension;

FIGURE 2 is a schematic view of a portion of a rigid rear wheel suspension of a motor vehicle incorporating a second embodiment of a device according to the invention;

FIGURE 5 is an enlarged view of the portion V shown in FIGURE 3; and

FIGURE 6 is an enlarged view of the portion VI shown in FIGURE 3.

In the two embodiments, structurally or functionally like parts are denoted by like reference numerals.

Figure 3:
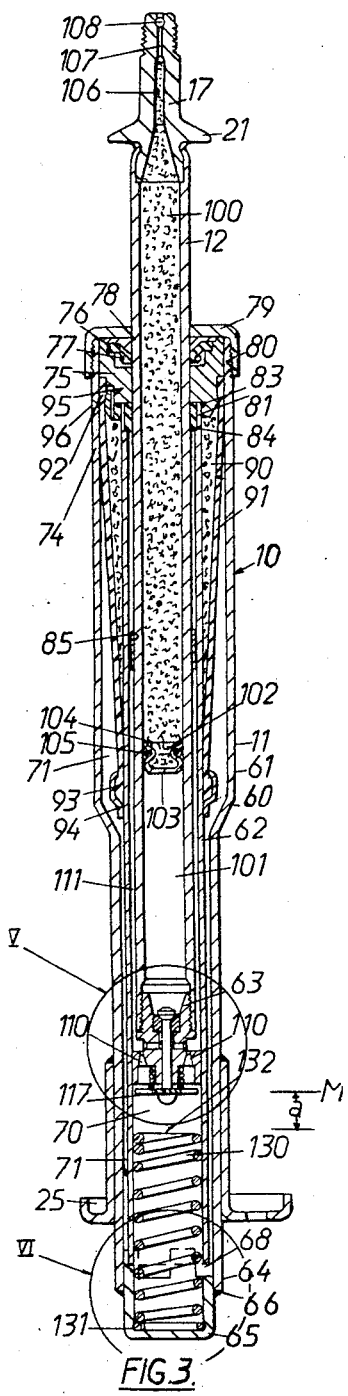
FIGURE 3 is a longitudinal section through the hydropneumatic suspension device shown in FIGURE 1.
Figure 4:
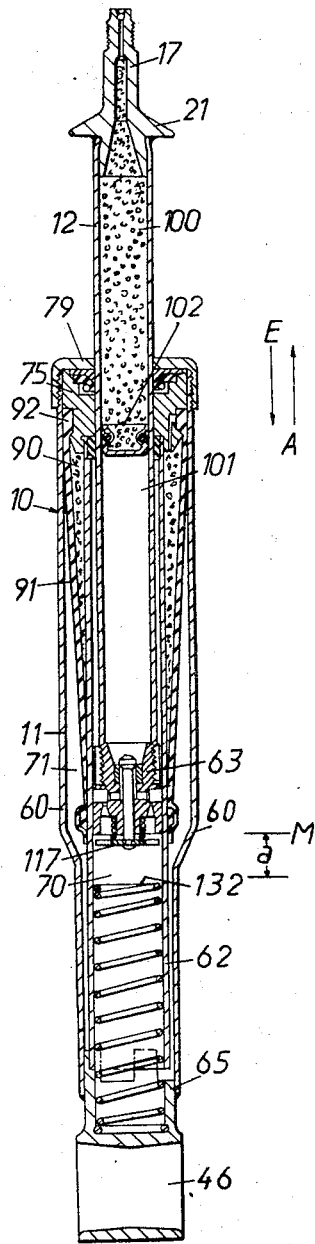
FIGURE 4 is a longitudinal section through the hydropneumatic suspension device shown in FIGURE 2.

The hydropneumatic suspension device 10 shown in both FIGURES 3 and 4 comprises two oppositely movable parts, namely a working cylinder 11 and a piston rod 12, arranged between the frame or body and the unsprung portion of a motor vehicle.

In the first embodiment, as shown in FIGURE 1, the outer end of the piston rod 12 is mounted rotatably and in universal joint fashion in a support tube 13 of a wheel housing 14, through the intermediary of a shaped rubber portion 15 seated in an opening 16 of the support tube 13. A tapered end 17 of the piston rod 12 penetrates through a bore 18 in the shaped rubber portion 15 and is elastically attached outside the support tube 13 by means of a washer 19 and a nut 20. Inside the support tube 13, the shaped rubber portion 15 bears against a collar 21 on the piston rod 12, and continues beyond the collar 21 to form a buffer 22.

A tubular flange 25 is welded to the bottom end of the working cylinder 11, and rests on a stub axle holder 26 of the front wheel suspension, both parts being rigidly united by a screw connection (bolt 27 and nut 28). This screw connection allows easy exchange of the device 10.

A stub axle holder 26 connects a stub axle 29 to a bracket 30 which is connected by way of a ball joint to the outer end of a transverse pivotal link 33. The other end 34 of the link 33 is resiliently joined to a cross member 35 of the vehicle: this cross member 35 is fixed to a side member 38 of the vehicle by means of a bolted connection (bolt 36 and nut 37). 39 designates a portion of the front engine bearer and 40 denotes a road wheel. By means of a steering arm (not shown) the stub axle holder 26—and consequently also the road wheel 40—may be turned about an axis which coincides with the longitudinal axis L of the device 10. This front suspension is thus a strut-type suspension.

In the rear suspension shown in FIGURE 2, the upper extremity of the piston rod 12 is universally mounted in the support tube 13, which is connected to the frame or a floor portion 45 of the vehicle in the same manner as described in relation to FIGURE 1.

At the other end of the device 10, the working cylinder 11 is provided with a mounting eye 46 (shown also in FIGURE 4). A bolt 47 passes through the eye 46 with the interposition of two rubber bushes 48 and 49, and is retained by a nut 50 and washer 51. The bolt 47 is secured to a yoke 52, which in turn is welded to an axle support tube 53 for a rear wheel 54 of the vehicle.

As is shown in FIGURES 3 and 4, the working cylinder 11 consists of an outer tube 61 which is stepped at 60, and a damper tube 62 disposed coaxially within the outer tube. The piston rod 12 plunges into the damper tube 62, and a damper piston 63 slides in the damper tube.

At its lower extremity 64, the outer tube 61 is closed by a cap 65 welded to it along a joint 66. In the embodiment shown in FIGURE 4, the eye 46 is connected to the cap 65, as also illustrated in FIGURE 2. As shown in FIGURE 6, this cap 65 is provided with a recessed portion 67, and cut-outs 68. The bottom end 69 of the damper tube 62 is pushed into the recessed portion 67, to hold the tube rigidly concentric relatively to the outer tube 61. The cut-outs 68 interconnect a working space 70 and an outer annular space 71.

At the upper extremity 74 (FIGURES 3 and 4) of the outer tube 61, the piston rod 12 is guided in a bearing 75. Sealing is ensured by a high-pressure packing 76 subject to the action of a ring spring 77 and a dust excluder 78. A cover 79 is screwed to an external thread 80 at the upper extremity 74 of the outer tube 61.

The damper tube 62 is secured in gas-tight and fluid-tight manner in a bore 81 of the bearing 75, sealing being ensured by a packing 83. A ring 84 serves as a stroke limited for the piston rod 12: under excessive outward telescopic movement (see arrow A), a stop 85 secured to the piston rod 12 bears against the ring 84. An annular space 90 for a gas spring is delimited by a tubular flexible diaphragm 91 surrounding the damper tube; the upper edge of the diaphragm has a bead 92 which forms a seal between the outer tube 61 and bearing 75, and the lower edge of the diaphragm has a bead 93 which surrounds the damper tube 62 and is firmly held by a pressed-on clamp band 94.

The space 90 between the tubular flexible diaphragm 91 and the damper tube 62 is filled with a gas, in this embodiment nitrogen, introduced under pressure through a passage 95 in the bearing 75 and a bore 96 in the outer tube 61, by pushing an injection needle (not shown) through the bore 96 and the bead 92; when the design pressure is attained, the injection needle is withdrawn and the puncture hole seals itself.

The piston rod 12 is formed as a tube. Its interior is divided into a high-pressure gas reservoir 100 and a liquid storage space 101, separated by a floating piston 102 comprising a cup-shaped pressing 103 having a groove 104 containing a seal 105. The gas in the high-pressure reservoir 100 is highly compressed nitrogen, introduced through bores 106 and 107; when filling is complete, the bore is closed by means of a ball 108. For ease of reference the gas-filled spaces 90 and 100 are shown dotted; all other spaces of the device are filled with damper liquid (hydraulic fluid).

The damper piston 63 has two functions. Firstly, it acts as a damper piston for absorbing vibrations between the vehicle body and chassis, and secondly it acts as a pump piston for adjusting the standing height of the body relatively to the road surface. It includes ducts 110 (see particularly FIGURE 5) which interconnect the working space 70 and an annular space 111 surrounding the piston rod, and are formed to give a design flow characteristic. In the present embodiment, as is shown in FIGURE 5, the ducts 110 are made funnel-shaped, with the result that they act chiefly as throttling members during outward telescopic movement (in the direction of arrow A), and as nozzles during inward telescopic movement (in the direction of arrow E).

The damper piston 63 also includes aligned axial bores 112 and 114, the bore 114 having a larger diameter than the bore 112. A valve stem 113 is guided in the bore 112, and has at one of its ends a valve disc 116, whereas the other end protrudes a little out of the damper piston 63 and carries a stop plate 117. The stop plate has recesses 118 at its edge, to allow fluid to reach the ducts 110. A helical spring 120 is arranged between the stop plate 117 and the damper piston 63. The high pressure in the liquid storage space 101 and the force of the helical spring 120 tend to hold the valve disc 116 on a seating 121.

Perpendicular to the axial bore 112 in the damper piston 63 there are transverse bores 122 interconnecting the bore 114 and the annular space 111 surrounding the piston rod.

By means of a thread 123, the damper piston 63 is screwed into the bottom end of the piston rod 12. Arranged between the cap 65 and the damper piston 63 there is an abutment spring 130 which serves as a regulating spring (see FIGURES 3 and 4). The spring 130 is retained by a groove 131 in the cap 65. In the drawings, the damper piston 63 is shown in its normal position M (FIGURE 3), in which the vehicle superstructure is at its design standing height relatively to the road. The length of the abutment spring 130, and thus the distance $a$ of its free end 132 from the stop plate 117, is such that the free end of the spring is in the region of the points of reversal of moderate deflections of the damper piston 63 about its normal design position M. The strength of the abutment spring 130 is such that when the spring engages the stop plate 117, the valve disc 116 is gradually lifted off the packing 121.

The abutment spring 130 could for some applications be replaced by some other form of abutment, for example a rigid abutment.

The mode of operation of the device is as follows:

If the vehicle is laden, the damper piston 63 leaves its normal position M and travels downwards (in the direction of the arrow E). As soon as the distance $a$ has been traversed, the stop plate 117 makes contact with the upper end of the abutment spring 130. After some further travel of the damper piston 63, the compression force loading the disc valve 116, and the force of the spring 120, are both overcome, so allowing the disc valve 116 to lift from its seat.

Fluid then flows from the storage space 101 via the axial bore 114 and the transverse bores 122 to the annular space 111 surrounding the piston rod, and also via the ducts 110 to the working space 70. The damper piston 63 is raised by an amount corresponding to the volume of inflow, and it passes into the region of the normal position M. This level, once reached, is maintained independently of any further additional loading and irrespective of whether the vehicle is stationary or moving smoothly along.

During movement of the vehicle, unevennesses in the road cause the damper piston 63 to oscillate about its normal design position M. Rapid outward telescopic movements (in the direction of arrow A) cause the pressure in the annular space 111 surrounding the piston rod to increase as a result of the flow resistance of the ducts 110, which here act as throttling members. The quicker these movements are, the greater are the pressure increases in the annular space 111. As soon as the pressure in the annular space 111 is capable of lifting the disc valve 116 from its seat in opposition to the pressure in the storage space 101 and the action of the spring 120, fluid flows into the storage space 101. With progressive increase in the pressure in the storage space 101, the above-described pumping action diminishes.

During inward telescopic movements (in the direction of arrow E), fluid flows from the working space 70 via the ducts 110 into the annular space 111 surrounding the piston rod, the ducts here acting as nozzles. The valve disc 116 remains closed.

The entry of fluid into the storage space 101 causes gradual lowering of the damper piston 63, even with the load remaining constant, until finally the stop plate 117 is contacted by the abutment spring 130 and valve disc 116 is lifted off its seat. This allows fluid to emerge from the storage space 101, again raising the damper piston 63. In this way, the damper piston 63 oscillates about its normal design position during vehicle movement.

Temperature fluctuations alter the volume of the gas spring in the space 90 of the remaining liquid filling. A large increase in volume at constant load causes the damper piston 63 to move on average in the direction of the arrow A, so causing the valve disc 116 to be lifted from its seat when the oscillatory deflections are rapid, with the result that liquid is transferred from the working space 70 to the storage space 101. Consequently the damper piston 63 again moves down into its normal position.

Conversely, a reduction in volume at constant load causes the damper piston 63 to be displaced on average in the direction of the arrow E, so causing the valve disc 116 to be lifted from its seat as soon as the stop plate 117 is moved by the helical abutment spring 130, with the result that fluid passes out of the storage space 101 into the working space 70. Once again, the damper piston 63 is thereby moved into its normal design position M. This latter action also can take place with the vehicle stationary.

If the vehicle is unloaded, the damper piston leaves its normal position M and travels in the direction of the arrow A. A reduction in the standing height of the vehicle superstructure occurs as the device cools to ambient temperature, as occurs after every journey.

The device which has just been described is relatively simple and inexpensive, and only a relatively small number of close-machined parts are needed, so contributing to reliability. A pair of such devices can readily be used as telescopic struts forming the steering axes of front wheels of a motor vehicle, or can be used in a rear wheel suspension, for example in a station wagon, to maintain a substantially constant standing height and so reduce the effect of changes in load on the angle of the headlamp beams.

I claim:

1. A hydropneumatic suspension device comprising: a damper tube for hydraulic fluid;
   a hollow piston rod which has one end disposed within the damper tube and includes in its hollow interior a storage space serving as a pressure reservoir;
   a damper piston which is slidably disposed within the damper tube and is connected to said one end of the piston rod, the damper piston dividing the interior of the damper tube into a working space and an annular space surrounding the piston rod, and being formed with at least one duct interconnecting the working space and the annular space;
   a suspension spring device arranged to resiliently resist displacement of hydraulic fluid from the working space; and
   a valve which is carried by the piston and is relatively movable thereon into a position establishing a connection between the working space and the storage space.

2. A hydropneumatic suspension device according to claim 1, wherein the valve which is carried by the piston is subject at all times to opposed hydraulic pressures from the working space and from the storage space.

3. A hydropneumatic suspension device according to claim 2, wherein the hydraulic pressure from the storage space acts on the valve in a sense tending to cause the valve to interrupt the connection between the working space and the storage space.

4. A hydropneumatic suspension device according to claim 3, wherein the valve which is carried by the piston is movable into its position establishing a connection between the working space and the storage space by engagement of the valve with an abutment carried by the damper tube.

5. A hydropneumatic suspension device according to claim 4, wherein the abutment comprises one end portion of a helical compression spring the other end portion of which is seated on a part rigid with respect to the damper tube.

6. A hydropneumatic suspension device according to claim 5, wherein the said one end portion of the abutment spring is in the region of the points of reversal of moderate deflections of the damper piston about its normal design position.

7. A hydropneumatic suspension device according to claim 5, wherein the valve includes a stop plate for engagement with the abutment spring.

8. A hydropneumatic suspension device according to claim 7, wherein a second spring interposed between the stop plate and the damper piston acts on the valve in a sense tending to cause the valve to interrupt the connection between the working space and the storage space.

9. A hydropneumatic suspension device according to claim 4, wherein a floating piston which is slidably disposed within the hollow piston rod separates the storage space from a high-pressure gas reservoir.

10. A hydropneumatic suspension device according to claim 9, wherein the suspension spring device is a gas spring comprising a flexible diaphragm subject to the action of a gas under pressure.

11. A hydropneumatic suspension device according to claim 10, wherein the flexible diaphragm is of tubular form and surrounds part of the damper tube.

12. A hydropneumatic suspension device according to claim 1, connected between a sprung portion of the vehicle and a carrier for a respective road wheel of the vehicle.

13. A hydropneumatic suspension device according to claim 4, connected between a sprung portion of the vehicle and a carrier for a respective road wheel of the vehicle.

14. A hydropneumatic suspension device according to claim 11, connected between a sprung portion of the vehicle and a carrier for a respective road wheel of the vehicle.

References Cited

UNITED STATES PATENTS

| 3,128,088 | 4/1964 | Paschakarnis | 267—64 |
| 2,916,296 | 12/1959 | Muller | 280—124 |
| 3,168,302 | 2/1965 | Burris | 267—64 |

PHILIP GOODMAN, Primary Examiner.

U.S. Cl. X.R.

267—64